US011063997B1

(12) United States Patent
Pedrini et al.

(10) Patent No.: US 11,063,997 B1
(45) Date of Patent: Jul. 13, 2021

(54) HIGHER ORDER MANIFEST DATA COMPRESSION

(71) Applicant: Amazon Technologies, Inc., Seattle, WA (US)

(72) Inventors: Mairo Pedrini, Seattle, WA (US); Kyle Bradley Koceski, Seattle, WA (US); Joshua Lamb, Bellevue, WA (US); Yongjun Wu, Bellevue, WA (US); Parminder Singh, Seattle, WA (US); Michael Coleman, Portland, OR (US); Nicolas Weil, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 16/367,651

(22) Filed: Mar. 28, 2019

(51) Int. Cl.
*H04L 29/08* (2006.01)
*H04L 29/06* (2006.01)
*H04N 19/70* (2014.01)

(52) U.S. Cl.
CPC .......... *H04L 65/601* (2013.01); *H04L 65/607* (2013.01); *H04L 65/608* (2013.01); *H04L 67/02* (2013.01); *H04N 19/70* (2014.11)

(58) Field of Classification Search
CPC .............................. H04L 67/02; H04L 65/601
See application file for complete search history.

(56) References Cited

U.S. PATENT DOCUMENTS

2018/0035176 A1\* 2/2018 Stockhammer ....... H04L 67/146
2018/0103199 A1\* 4/2018 Hendry .............. H04N 21/2343

\* cited by examiner

*Primary Examiner* — Adnan M Mirza
(74) *Attorney, Agent, or Firm* — Weaver Austin Villeneuve & Sampson LLP

(57) ABSTRACT

Methods and apparatus are described for efficiently representing manifests and playlists for media presentations. Some media streaming protocols include repetition syntax by which a sequence of media segments having the same duration can be represented with a single entry. A pattern syntax is introduced by which repeating patterns of segment durations in a cycle may be represented in manifests and playlists.

22 Claims, 7 Drawing Sheets

```
Update1:
    <SegmentTimeline>
        ...
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="2" g="1"/>
        <S d="359040" g="1"/>
        <S d="360960" r="1" g="1"/>
        <S d="359040" g="1"/>
        <S d="360960" r="1" g="1"/>
    </SegmentTimeline>
```

*FIG. 4A*

```
Update2:
    <SegmentTimeline>
        ...
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="2" g="1"/>
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="2" g="1"/>
        <S d="359040" g="1"/>
        <S d="360960" r="1" g="1"/>
        <S d="359040" g="1"/>
        <S d="360960" r="1" g="1"/>   <-- Pattern is identified here.
        <S d="359040" g="1"/>
        <S d="360960" r="1" g="1"/>
    </SegmentTimeline>
```

*FIG. 4B*

```
Update3:
    <SegmentTimeline>
        ...
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="2" g="1"/>
        <S d="359040" g="1"/>
        <S d="360960" r="1" g="1"/>
        <S d="359040" g="1"/>
        <S d="360960" r="1" g="1"/>
        <P g="1" r="1"/>     <-- Pattern specifies repeat of g1, g2 begins below
        <S d="359040" g="2"/>
        <S d="360960" r="1" g="2"/>
        <S d="359040" g="2"/>
        <S d="360960" r="1" g="2"/>
        <S d="359040" g="2"/>
        <S d="360960" r="2" g="2"/>
    </SegmentTimeline>
```

*FIG. 4C*

```
Update4:
    <SegmentTimeline>
        ...
        <S d="359040" g="1"/>
        <S d="360960" r="1" g="1"/>
        <S d="359040" g="1"/>
        <S d="360960" r="1" g="1"/>
        <S d="359040" g="1"/>
        <S d="360960" r="2" g="1"/>
        <S d="359040" g="1"/>
        <S d="360960" r="1" g="1"/>
        <S d="359040" g="1"/>
        <S d="360960" r="1" g="1"/>
        <P g="1" r="2"/>
    </SegmentTimeline>
```

*FIG. 4D*

```
<SegmentTimeline>
    <Pattern t="178577078976" r="1">
        <S d="95232"/>
        <S d="96256" r="2"/>
    </Pattern>
    <S t="178577838976" d="95232"/>
</SegmentTimeline>
```

*FIG. 5A*

```
<!-- Initial -->
<SegmentTimeline>
    <Pattern t="178577078976" r="1">
        <S d="95232"/>
        <S d="96256" r="2"/>
    </Pattern>
    <S t="178577838976" d="95232"/>
</SegmentTimeline>

<!-- Update #1 -->
<SegmentTimeline>
    <Pattern t="178577078976" r="1">
        <S d="95232"/>
        <S d="96256" r="2"/>
    </Pattern>
    <S t="178577838976" d="95232"/>
    <S d="96256" r="1"/>
</SegmentTimeline>

<!-- Update #2 -->
<SegmentTimeline>
    <Pattern t="178577078976" r="2">
        <S d="95232"/>
        <S d="96256" r="2"/>
    </Pattern>
</SegmentTimeline>
```

*FIG. 5B*

```
<!-- Initial -->
<SegmentTimeline>
    <Pattern t="178577070976" r="100">
        <S d="95232"/>
        <S d="96256" r="2"/>
    </Pattern>
    <S d="95232"/>
</SegmentTimeline>

<!-- Update #1 -->
<SegmentTimeline>
    <S t="178577166208" d="96256" r="2"/>
    <Pattern t="178577454976" r="99">
        <S d="95232"/>
        <S d="96256" r="2"/>
    </Pattern>
    <S d="95232"/>
</SegmentTimeline>

<!-- Update #2 -->
<SegmentTimeline>
    <S t="178577262464" d="96256" r="1"/>
    <Pattern t="178577454976" r="99">
        <S d="95232"/>
        <S d="96256" r="2"/>
    </Pattern>
    <S d="95232"/>
    <S d="96256"/>
</SegmentTimeline>

<!-- Update #3 -->
<SegmentTimeline>
    <S t="178577358720" d="96256"/>
    <Pattern t="178577454976" r="99">
        <S d="95232"/>
        <S d="96256" r="2"/>
    </Pattern>
    <S d="95232"/>
    <S d="96256" r="1"/>
</SegmentTimeline>
```

*FIG. 5C*

HIGHER ORDER MANIFEST DATA COMPRESSION

BACKGROUND

For a variety of reasons it is generally desirable to keep the number of video segments of a media presentation the same as the number of audio segments, and to keep corresponding segments of the video and audio streams temporally aligned. Many video encoders are configured to generate video segments of fixed duration. This fixed duration is advantageous for efficiently generating a manifest (i.e., a list of segments and their locations used by client devices to acquire the segments of a media presentation). This is because the fixed duration allows for a sequence of many video segments to be collapsed into a single entry.

On the other hand, because of the sampling rates associated with most audio codecs, the fixed duration of the video segments does not correspond to an integer multiple of audio frames. Therefore, in order to maintain temporal alignment of the video segments and the audio segments, audio segments are typically generated with different durations; some slightly longer than the fixed video segment duration, and some slightly shorter. This allows for temporal alignment to be maintained. But this irregularity in audio segment durations has a downside in that the sequence of audio segments cannot be as efficiently represented in the manifest as the sequence of video segments. In fact, while the size of the video portion of the manifest might remain constant over the duration of a media presentation, the size of the audio portion of the manifest will increase linearly with the number of audio segments. This can be problematic for some client devices as the manifest consumes local memory and processing resources.

BRIEF DESCRIPTION OF THE DRAWINGS

FIGS. 4A-4D illustrate efficient representation of manifest data according to a particular implementation.

FIGS. 5A-5C illustrate efficient representation of manifest data according to a particular implementation.

DETAILED DESCRIPTION

Figure 1:
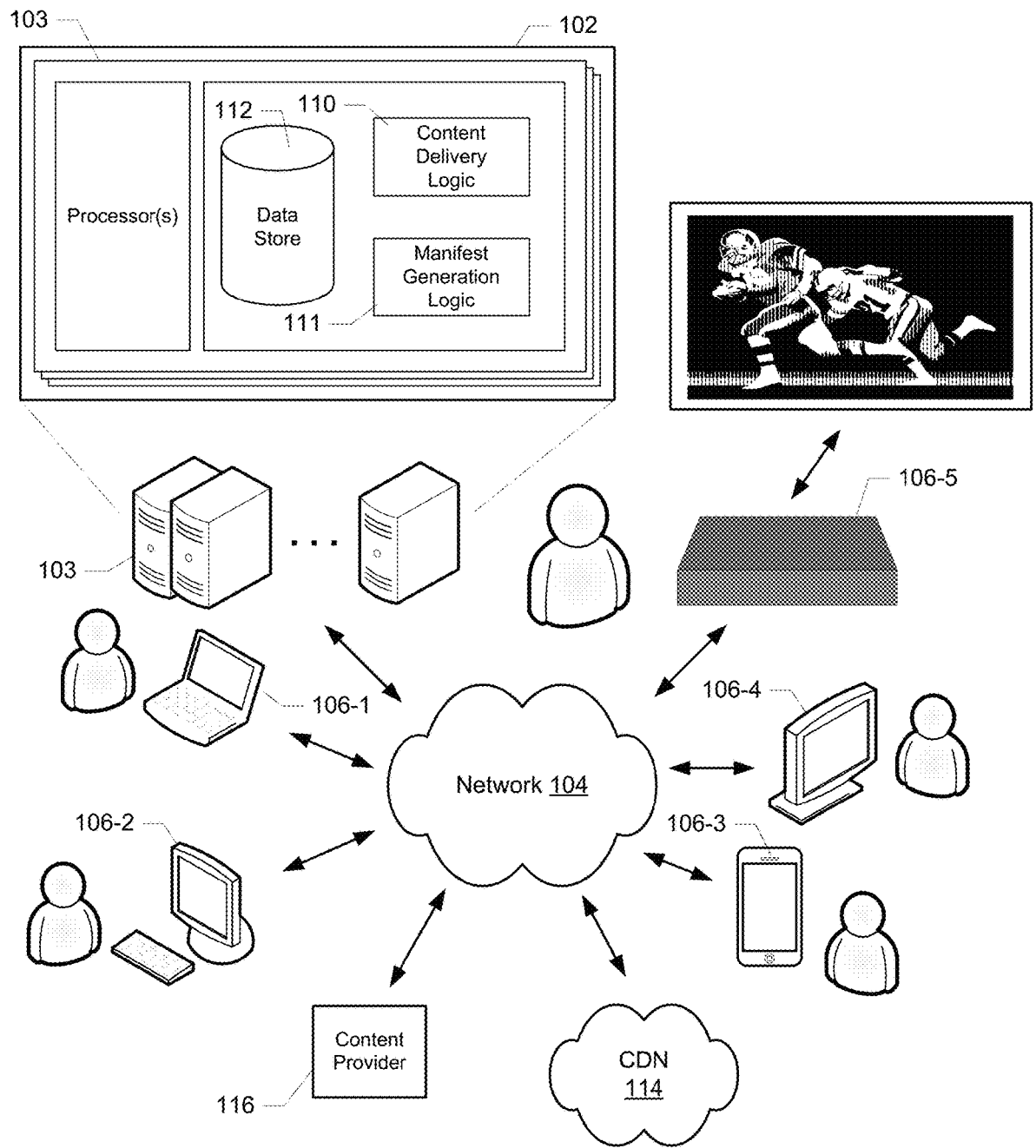
FIG. 1 illustrates an example of a computing environment in which implementations enabled by the present disclosure may be practiced.

This disclosure describes techniques for efficiently representing manifests (also referred to as playlists) for media presentations. Some media streaming protocols include repetition syntax by which a sequence of media segments having the same duration can be represented with a single entry. According to various implementations enabled by the present disclosure, a pattern syntax is introduced by which repeating patterns of segment durations may be represented in manifests. An example will be illustrative.

A manifest generated according to the Dynamic Adaptive Streaming over HTTP (DASH) standard includes a list of video segments representing the video component of a media presentation and a list of audio segments representing the audio component of the media presentation. Each entry (e.g., each SegmentTimeline or S element) in each list represents one or more segments in relation to the media timeline of the media presentation and includes a starting timestamp and a segment duration. The DASH standard includes syntax denoted "@r" that, when included as an attribute of a segment entry indicates a number of consecutive repetitions of segments having the specified duration.

For example, the SegmentTimeline element:
    <S t="111610068" d="60" r="4244"/>
is an example of a video timeline element that indicates that beginning at the timestamp "111610068" (specified with the attribute "t") there are 4245 video segments having the duration "60" (specified with the attribute "d"). In other words, thousands of video segments can be represented by a single S element because the video segments have the same duration. By contrast, because of the audio fragmentation issues discussed above, the number of audio segments in a row that have the same duration is relatively few (e.g., 3), resulting in a much longer list of S elements including, for example, a sequence such as:
    <S t="178577070976" d="95232"/>
    <S t="178577166208" d="96256" r="2"/>
    <S t="178577454976" d="95232"/>
    <S t="178577550208" d="96256" r="2"/>
    <S t="178577838976" d="95232"/>
    . . . .

This list indicates that, beginning at the timestamp "178577166208" (the second entry in the list) there are three consecutive segments having the duration "96256" followed by a single segment beginning at timestamp "178577454976" having the duration "95232." Thus, in this example, use of the DASH @r syntax only results in compression of four entries into two. As will be appreciated, and in contrast with the video segment list, despite the use of the @r syntax, the audio segment list will continue to grow linearly with the total duration of the media presentation.

According to various implementations enabled by the present disclosure, a syntax is introduced by which repeating patterns of segment durations may be represented, thereby providing a second order of compression of manifest data beyond what is possible with a first-order compression syntax such as the DASH @r syntax. In one example of a DASH implementation, a pattern syntax @p may be included as an attribute of an S element. The @p attribute is followed by multiple instances of the d attribute (distinguished from each other by a numerical index) specifying different durations present in the represented sequence of segments. Each duration might also have an associated instance of the r attribute specifying how many consecutive segments in the pattern have that duration.

Returning to the example above, the same audio segment list can be represented as follows:
    <S t="178577070976" d="95232"/>
    <S t="178577166208" p="1060" d1="96256" r1="2"
        d2="95232"/>
The second entry indicates that there are 1061 instances of the pattern specified by the d1, d2, and r1 attributes. In this example, each pattern p has three consecutive segments of duration "96256" (specified with the attributes d1 and r1) followed by one segment of duration "95232" (specified with the attribute d2). Thus, in this example, the @p pattern syntax allows for the representation of 4,244 audio segments with a single entry.

It should be noted that this is merely one example of an implementation of a pattern syntax that may be used to represent repeating patterns of segment durations. Other examples are discussed below. It should also be noted that implementations are contemplated in which a pattern syntax may represent an arbitrary number of segments durations in a particular pattern, as well as multiple patterns within a segment list. The scope of the present disclosure should therefore not be limited by reference to a particular example or syntax.

FIG. 1 illustrates an example of a computing environment in which a video content service 102 provides content via network 104 to a variety of client devices (106-1 through 106-5) in accordance with the techniques described herein. The content may include live or broadcast content, video-on-demand (VOD) content, and/or VOD-style content such as, for example, just-after-broadcast or JAB content (video content that is derived from a live or broadcast stream of video content and made available shortly after the end of the event for delivery in a manner similar to VOD content).

Content service 102 may conform to any of a wide variety of architectures such as, for example, a services platform deployed at one or more co-locations, each implemented with one or more servers 103. Network 104 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 106 may be any suitable device capable of connecting to network 104 and consuming content provided by service 102. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 102. Alternatively, such resources may be independent of content service 102, e.g., on a platform under control of a separate provider of computing resources with which content service 102 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 102 is described as if it is integrated with the platform(s) that provides content and manifests to client devices. However, it will be understood that content service 102 may provide access to content in conjunction with one or more content delivery networks (e.g., CDN 114) that may or may not be independent of content service 102. In addition, the source(s) of content may or may not be independent of content service 102 (e.g., as represented by content provider 116). The range of variations known to those of skill in the art are contemplated to be within the scope of this disclosure.

Some of the implementations enabled by the present disclosure contemplate logic resident on the client devices consuming video content from content service 102; such logic might be configured to handle, for example, the parsing of manifest data to generate requests for content segments. Such logic might be part of an existing algorithm or module on the client device or implemented to work in conjunction with such an algorithm or module.

It should also be noted that implementations are contemplated in which, in addition to content delivery logic 110 (which facilitates various aspects of content delivery to client devices 106), content service 102 includes other types of logic, e.g., manifest generation logic 111 that facilitates efficient representation of manifest data as enabled by the present disclosure. Such logic might be part of a packager in a content encoding and packaging pipeline. Alternatively, such logic might be separate from the components of such a pipeline, taking a manifest or playlist generated by the packager and compressing the information as described herein.

In addition to providing access to content, content service 102 may also include a variety of information related to the content (e.g., subtitle information, and other associated metadata and manifests in data store 112 to which service 102 provides access). Alternatively, such information associated with and/or about the content, as well as the content itself may be provided and/or hosted by one or more separate platforms, e.g., CDN 114. It should be noted that, while logic 110 and 111, and data store 112 are shown as integrated with content service 102, implementations are contemplated in which any of these operate remotely from the associated content service, and/or are under the control of an independent entity. From these examples, those of skill in the art will understand the diversity of use cases to which the techniques described herein are applicable.

Figure 2:
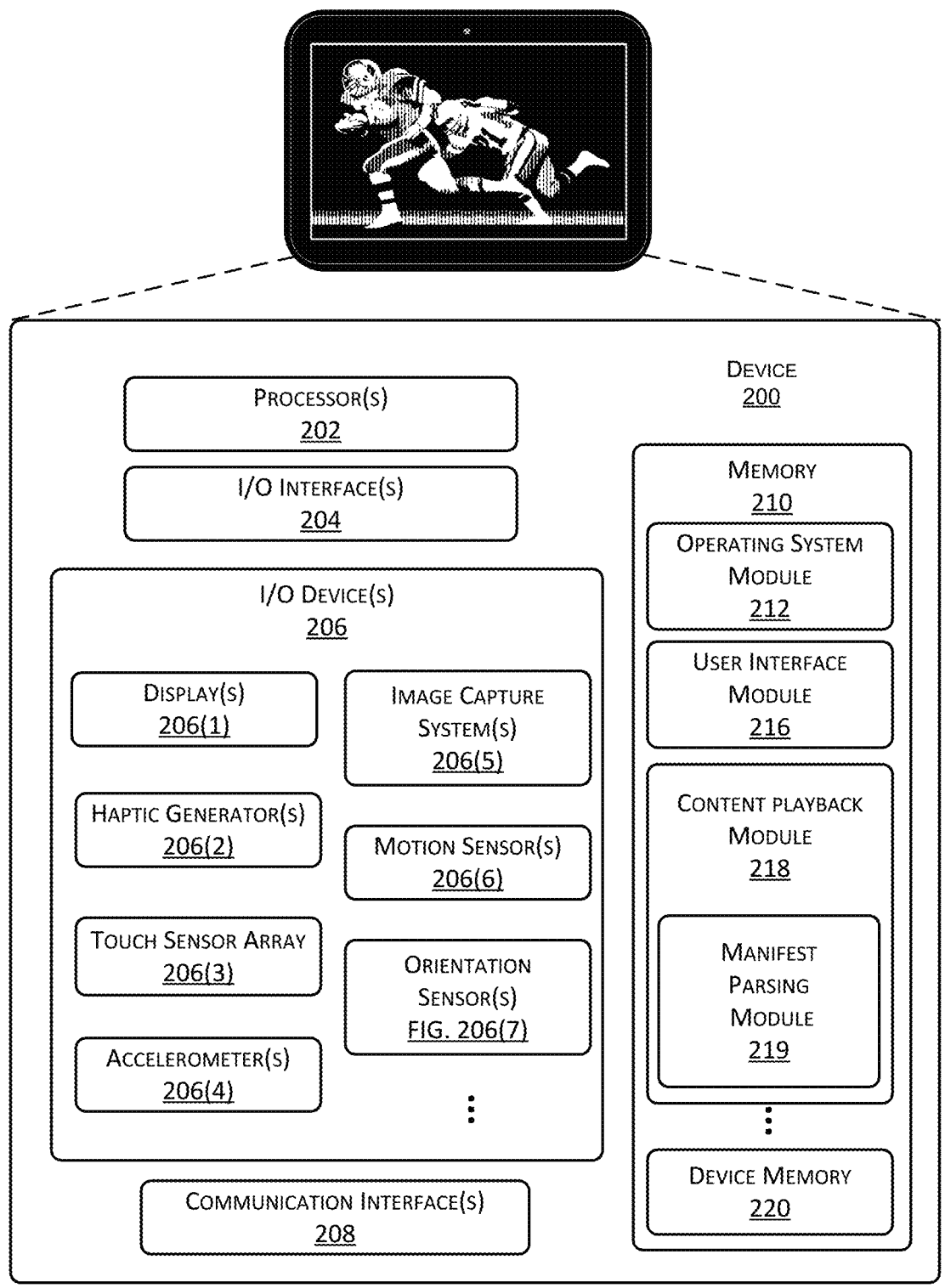
FIG. 2 is an example of a client device with which implementations enabled by the present disclosure may be practiced.

A block diagram of an example of a client device 200 suitable for use with various implementations is shown in FIG. 2. As mentioned above, it should be understood that device 200 may be any of a wide variety of device types. Device 200 (depicted as a tablet device) includes one or more single or multi-core processors 202 configured to execute stored instructions (e.g., in device memory 220). Device 200 may also include one or more input/output (I/O) interface(s) 204 to allow the device to communicate with other devices. I/O interfaces 204 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 204 is coupled to one or more I/O devices 206 which may or may not be integrated with client device 200.

Device 200 may also include one or more communication interfaces 208 configured to provide communications between the device and other devices. Such communication interface(s) 208 may be used to connect to cellular networks, personal area networks (PANs), local area networks (LANs), wide area networks (WANs), and so forth. For example, communications interfaces 208 may include radio frequency modules for a 3G or 4G cellular network, a WiFi LAN and a Bluetooth PAN. Device 200 also includes one or more buses or other internal communications hardware or software (not shown) that allow for the transfer of data and instructions between the various modules and components of the device.

Device 200 also includes one or more memories (e.g., memory 210). Memory 210 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 210 provides storage for computer readable instructions, data structures, program modules and other data for the operation of device 200. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 210 includes at least one operating system (OS) module 212 configured to manage hardware resources such as I/O interfaces 204 and provide various services to applications or modules executing on processor(s) 202. Memory 210 also includes a user interface module 216, a content playback module 218, and other modules. Memory 210 also includes device memory 220 to store a wide variety of instructions and information using any of a variety of formats including, for example, flat files, databases, linked lists, trees, or other data structures. Such information includes content for rendering and display on display 206(1) including, for example, any type of video content. In some implementations, a portion of device memory 220 may be distributed across one or more other devices including servers, network attached storage devices, and so forth.

Client side logic used for parsing manifest data that include pattern syntax as described herein (represented by manifest parsing module 219 in FIG. 2) may be implemented in a variety of ways, e.g., in hardware, software, and/or firmware. For example, at least some of this functionality may be implemented as part of the code of a media player operating on device 200. Alternatively, module 219 may be implemented separately from and interact with the device's media player, web browser, mobile app, decoder, etc.

It will also be understood that device 200 of FIG. 2 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 3:
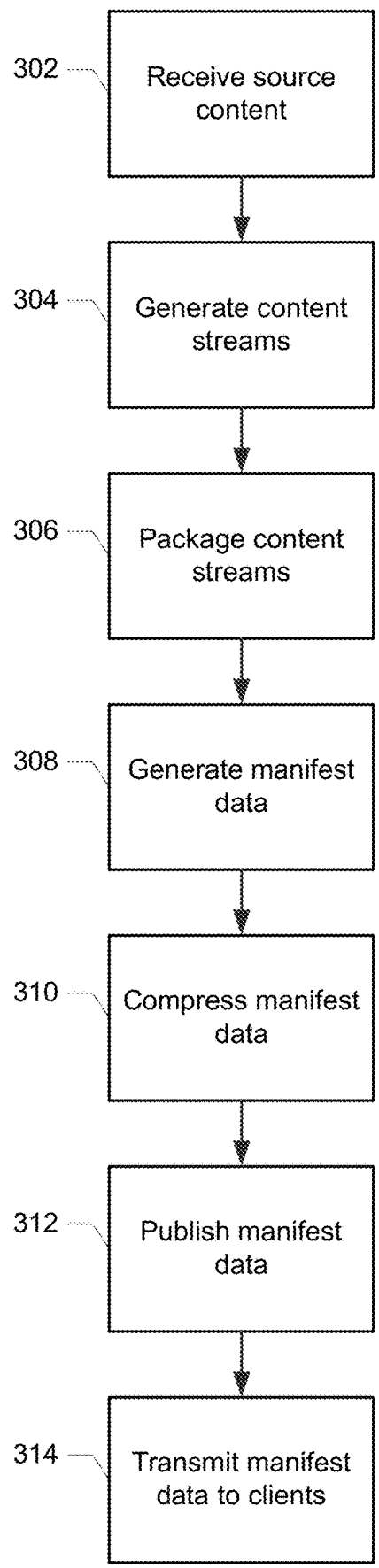
FIG. 3 is a flowchart illustrating operation of a class of implementations enabled by the present disclosure.

The generation of a manifest or playlist according to a particular implementation is illustrated in the flow chart of FIG. 3. Source content (e.g., in the form of one or more .mov or .avi files) is received by an encoding and packaging pipeline (302). The source content may be live or broadcast content being generated in real time, or it may be a complete media presentation (e.g., VOD or JAB content). One or more encoders compresses the content, generating a number of content streams corresponding to different bitrate versions of the content (304). This may be done using any of a variety of video and audio codecs including, for example, MPEG-1, MPEG-2, MPEG-4 Part 2, VC-1, H.263, VP8, VP9, Daala, H.264 (AVC), and H.265 (HEVC).

One or more packagers packages the content streams for delivery to client device in accordance with corresponding streaming techniques (306). Such techniques may include, for example, Apple's HTTP Live Streaming (HLS), Microsoft's Smooth Streaming, Adobe's HTTP Dynamic Streaming, DASH, etc. In conjunction with the packaging of the content streams, manifest data (also known as playlist data) are generated (308). These data are configured to enable client devices to request corresponding segments of the content streams.

The manifest data (e.g., the audio segment timeline list) is compressed using the pattern syntax enabled by the present disclosure (310) and the compressed manifest is published (312) for downloading by client devices (314). The manifest enables the client devices to establish content streaming sessions in which the client devices request and download segments of the content using the manifest. As will be discussed, the manner in which the manifest data are compressed may vary depending on a number of factors including, for example, the streaming technique used (e.g., DASH vs. HLS), the nature of the pattern syntax, the type of content (e.g., broadcast vs. VOD), whether the pattern of segment durations is known in advance, etc.

For example, as in the case of the audio segment duration pattern described above, the repeating pattern (three consecutive segments of one duration followed by one segment of another) is known and may be provided to the manifest generation logic in advance so that it can recognize instances of the pattern. Alternatively, a pattern of segment durations (audio or video) may not be known in advance, in which case, the logic can parse the manifest data to first identify any repeating patterns and then look for instances of that pattern. In another example, a pattern may be defined in the encoding and packaging pipeline upstream from manifest generation, e.g., during fragment generation in the fragmentation stage or content encoding stage.

In another example relating to broadcast or live content, the manifest data are generated in real time, portions of which are typically updated and published as new segments of the content streams are encoded and packaged. In such cases, the compression of the manifest data may be iterative, alternating with publication of early versions of the manifest. By contrast, manifest data for an entire media presentation of VOD or VOD-style content might be completely generated and then compressed in a single pass through the data, or be iteratively compressed as the segments lists are generated.

In another example, the nature of the pattern syntax affects the way in which the compression of the manifest data is achieved. One example was discussed above in which a repeating pattern is represented using attributes within a DASH segment element. These include a pattern attribute @p that specifies the repeat count of a corresponding pattern of contiguous segments having multiple durations expressed by the values of multiple duration attributes @dn and one or more repetition attributes @rn, where n is an index starting from 1. The @p attribute is zero-based, i.e., a value of three means four patterns in a row.

According to a particular implementation using this syntax, and analogous to the features of the @r syntax in DASH, a negative value of the @p attribute indicates that the duration indicated in the current pattern repeats until the start of the next S element, the end of the DASH Period, or until the next manifest update. Between the timestamp @t of the current S element and @t of the next S element, the end of the Period, or until the next manifest update, it shall have an integer number of patterns repeated to fill the gap.

Another example of a pattern syntax in the context of DASH uses S elements to self-document a repeating pattern by creating groups, and then specifying how often those self-described groups repeat. This approach introduces a new element attribute and a new timeline element. A group attribute (@g) is a numerical grouping id that can be included in any S element. A pattern element P represents the repeating pattern at the level of an S element. The pattern element P includes a group attribute @g that specifies an identifier of the group of segments that repeats with the corresponding pattern, a timestamp @t of the pattern (optional), and a repetition attribute @r representing the number of times the pattern repeats. The P element may also include a duration attribute @d representing the duration of the pattern.

The P element and these various attributes allow for N-order compression of a segment timeline list and supports identification of complex patterns beyond what is typically encountered because of the audio compression issued discussed above.

According to a specific implementation using this pattern syntax, as segments are added to the segment timeline list (or as they are encountered in parsing of a previously generated list), the segments are grouped until a repeating pattern is found. For example, as shown in FIGS. 4A (Update 1) and 4B (Update 2), segments are assigned to the group @g=1 by including a value of 1 for the g attribute. This is done until a pattern is recognized as denoted by the text "<-- Pattern is identified here" in FIG. 4B.

As shown in FIG. 4C (Update 3), once a pattern for group @g=-1 is identified, the segment elements in the group are collapsed into a P element. Additional segment elements would then be assigned to new group designated by @g=2 until such time when the group @g=2 is identified as being an instance of group @g=1. Those segments are then collapsed into the P element for group @g=1, and the @r attribute of the P element is incremented as shown in FIG. 4D. As will be appreciated, the approach to pattern syntax in this example maintains the concise language of the SegmentTimeline while supporting the representation of duration patterns beyond the audio-compression-related pattern discussed above.

Yet another example of a pattern syntax in the context of DASH uses a different pattern element P that also exists as a peer element to the S element in the SegmentTimeline and allows for the grouping of a set of S elements into a pattern. The P element also contains child S elements that represent a repeating pattern of multiple segments as depicted in FIG. 5A.

This pattern element has three potential attributes @t, @r, and @d, which have matching semantics for the same attributes from an S element. The Pattern element contains [2 . . . N] child S elements which include @d duration attributes, and may have an @r repetition attribute. If present in the P element, an @d attribute must match the sum of the durations of all contained child S elements. If an @d attribute is not present in the P element, the duration of the pattern is the sum of the durations of all contained child S elements. The child S elements within a P element do not include @t attributes as the timestamps would not correspond to the segments associated with subsequent repetitions of the pattern.

If the @t of an S element or P element is absent, the value is assumed to be zero for the first element of the SegmentTimeline. For the subsequent S and P elements, the value is assumed to be the sum of the previous S element's earliest presentation time and contiguous duration (e.g., previous S element's @t+@d*(@r+1)), or the sum of the previous P element's earliest presentation time and contiguous duration (e.g., previous P element's @t+@d*(@r+1)).

A P element is a representation of a set of segments. On subsequent updates to the manifest, the set of segments of a pattern and their timing do not change. Also on subsequent updates to the MPD, a set of S elements may be replaced with a P element as long as the timing of the segments does not change. Additionally, a manifest that includes a P element may have the P element removed on subsequent updates as long as the timing of the segments does not change (e.g., as in the case when the first segment of a pattern falls out of availability). The addition of a P element may introduce segments that had not previously been introduced in the manifest.

According to a particular implementation, a pattern once defined in the manifest does not change upon subsequent updates to the manifest even if a different pattern with the same segments is possible. Once a pattern is introduced, the @t may be increased and the @r decremented as segments may fall out of availability before the pattern. Also, S elements ahead of the pattern may match the pattern and be removed in favor of incrementing the @r attribute of the P element. Segments may both fall out of the pattern and be collapsed into the pattern during the same update (in which case, the P element's @r might not change).

FIG. 5B illustrates an example of updates to a Segment-Timeline using the pattern syntax illustrated in FIG. 5A, and in which segments are added to an existing pattern with a time stamp of "178577070976." In the depiction labeled "Initial," a single S element with a time stamp of "178577838976" and a duration "95232" follows the P element. In Update #1, two S elements are added with durations "96256" (as indicated by the value of the @r attribute). The addition of another S element with the duration "96256" matches the pattern represented by the P elements child S elements and so results in the collapse of the new instance of the pattern into the P element as indicated by the incrementing of the value of the @r attribute in the P element from 1 to 2 (Update #2).

FIG. 5C illustrates an example of updates to a Segment-Timeline using the pattern syntax illustrated in FIG. 5A, and in which segments are added and removed. The depiction labeled "Initial" is for the same pattern as the example of FIG. 5B except that the @r attribute now indicates that 101 instances of the pattern are represented. In Update #1, the list is updated to reflect that the first segment in the first instance of the pattern is no longer available and so has dropped off the list. This means that the corresponding instance of the pattern is no longer complete, and only 100 instances of the pattern remain. This is reflected in the decrementing of the @r attribute in the P element and the inclusion of an S element prior to the P element that represents the remaining 3 segments of the instance of the pattern that was removed.

Update #2 illustrates the removal of one of the 3 segments prior to the P element as reflected by decrement of that S element's @r attribute from 2 to 1 and the update of its timestamp from "178577166208" to "178577262464." Update #2 also reflects the addition of an S element at the end of the list representing a new segment of duration "96256." Similarly, Update #3 reflects the removal of one of the 2 remaining segments prior to the P element as reflected by removal of the S element's @r attribute and the update of its timestamp. Update #3 also reflects the addition of another S element of duration "96256" at the end of the list as reflected by the introduction of an @r attribute in the last S element with a value of 1.

As will be appreciated by those of skill in the art, audio segments having different durations is not an issue unique to DASH implementations, with the phenomenon appearing in implementations relating to other streaming protocols such as, for example, HLS, Smooth Streaming, HTTP Dynamic Streaming. Thus, it should be understood that implementations are contemplated in which pattern syntaxes similar to those described in the example above are used in the context of these other streaming protocols.

Moreover, in addition to being able to represent arbitrary patterns of segments having an arbitrary number of different durations, pattern syntaxes enabled by the present disclosure are not limited to the representation of audio segments, but may be used to represent patterns of segment durations for other types of content including, for example, video segments and subtitle segments.

According to a particular class of implementations, a pattern syntax may be represented in a manifest or playlist using a reference, link, or pointer to a pattern definition or template stored elsewhere in the data associated with a media presentation. For example, the pattern definition might be specified at the Media Presentation Description (MPD) level, or at a different level of the MPD hierarchy such as, for example, the level of an adaptation set, a representation, a period, etc.

According to a particular implementation, one or more pattern definitions may be represented under a list node at the MPD level. This representation might use, for example, a <Patterns> tag as follows:

```
<Patterns>
    <Pattern id="1">
        <S d="95232"/>
        <S d="96256" r="2"/>
    </Pattern>
    <Pattern id="2">
        <S d="95234"/>
        <S d="96258" r="3"/>
    </Pattern>
</Patterns>
```

The @id syntax in each P element specifies a unique identifier for each pattern definition which is then specified by the child S elements using the @d and @r syntaxes to specify the durations and repetitions counts for the corresponding durations. The @id syntax need not be present if only one pattern is specified. In the example shown, the first pattern (Pattern id=1) indicates a repeating pattern of one segment of duration "95232" followed by 3 segments of duration "96256." The second pattern (Pattern id=2) indicates a repeating pattern of one segment of duration "95234" followed by 4 segments of duration "96258." Using this approach, an arbitrary number of pattern definitions may be specified without the requirement that the details of a pattern be repeated in the manifest or playlist.

Such an approach allows for the efficient representation of pattern syntax across different adaptation sets or representations of a media presentation. For example, a media presentation might have audio components for each of a large number of combinations of languages and audio codecs. Specification of a pattern definition at the MPD level allows for the same pattern syntax to be used for multiple languages within a particular codec, while simultaneously allowing for different pattern syntaxes to be used for different codecs. In addition, where there are discontinuities in the content (e.g., at period boundaries or due to ad insertion), the details of the pattern do not need to be specified again when the pattern begins to repeat on the other side of the discontinuity. Instead, a reference to the Pattern id may be used such as the following:

```
<SegmentTimeline>
    <Pattern id="1" t="178577070976" r="1"/>
    . . . .
</SegmentTimeline>
```

This Pattern element in the Segment Timeline indicates that at timestamp t="178577070976," there are two instances of the pattern corresponding to Pattern id=1. The Pattern element might also or alternatively specify the duration over which the pattern repeats (e.g., using the @d syntax).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving a media presentation, the media presentation including a sequence of video segments and a sequence of audio segments, the video segments all being of a same duration, the sequence of audio segments including first audio segments of a first duration, and second audio segments of a second duration different from the first duration, the sequence of audio segments including a repeating pattern of the first and second audio segments;
generating video timeline data according to the dynamic adaptive streaming over HTTP (DASH) protocol, the video timeline data representing each of the video segments relative to a media timeline of the media presentation, the video timeline data employing an @r syntax of the DASH protocol to represent consecutive video segments having the same duration;
generating audio timeline data according to the DASH protocol, the audio timeline data representing each of the audio segments relative to the media timeline, the audio timeline data employing the @r syntax to represent consecutive audio segments having the first duration, the audio timeline data also including a pattern syntax that represents instances of the repeating pattern of the first and second audio segments; and
publishing the video timeline data and the audio timeline data as part of a DASH manifest configured to enable a client device to download or stream the media presentation.

2. The method of claim 1, further comprising detecting the repeating pattern during generation of the audio timeline data by inspecting the sequence of audio segments.

3. The method of claim 1, further comprising receiving the repeating pattern prior to generation of the audio timeline data.

4. The method of claim 1, wherein the repeating pattern includes a plurality of the first audio segments followed by one or more of the second audio segments.

5. A computer-implemented method, comprising:
   receiving a media presentation, the media presentation including a sequence of media segments, the sequence of media segments having a plurality of different durations, the sequence of media segments including a repeating pattern of the different durations;
   generating media timeline data, the media timeline data representing each of the media segments relative to a media timeline of the media presentation, the media timeline data employing a pattern syntax to represent instances of the repeating pattern; and
   publishing the media timeline data as part of a manifest configured to enable a client device to download or stream the media presentation.

6. The method of claim 5, wherein the manifest is conformant with one of the dynamic adaptive streaming over HTTP (DASH protocol), the HTTP Live Streaming (HLS) protocol, the HTTP Dynamic Streaming protocol, or the Smooth Streaming protocol.

7. The method of claim 5, wherein the pattern syntax in the manifest includes a reference to a pattern definition stored in metadata associated with the media presentation.

8. The method of claim 5, further comprising detecting the repeating pattern during generation of the media timeline data by inspecting the sequence of media segments.

9. The method of claim 5, further comprising receiving the repeating pattern prior to generation of the media timeline data.

10. The method of claim 5, further comprising defining the repeating pattern during a fragmentation stage or a content encoding stage of an encoding and packaging pipeline.

11. The method of claim 5, wherein the pattern syntax employs a pattern attribute, a plurality of duration attributes, and one or more repetition attributes, and wherein a segment element specifies values for each of the pattern attribute, the duration attributes, and the one or more repetition attributes to represent the instances of the repeating pattern.

12. The method of claim 5, wherein the pattern syntax employs a pattern element, and wherein at least one of a plurality of segment elements includes a repetition attribute, each segment element including a duration attribute, each segment element also including a group attribute that represents a corresponding group to which the segment element belongs, a first group of the segment elements corresponding to one or more instances of the repeating pattern, the pattern element including the group attribute representing the first group, the pattern element also including the repetition attribute representing a number of the instances of the repeating pattern.

13. The method of claim 5, wherein the pattern syntax employs a pattern element, and wherein at least one of a plurality of segment elements includes a repetition attribute, each segment element including a duration attribute, a subset of the segment elements being child elements of the pattern element, the subset of the segment elements corresponding to one or more instances of the repeating pattern, the pattern element including the repetition attribute representing a number of the instances of the repeating pattern.

14. A system, comprising one or more computing devices configured to:
   receive a media presentation, the media presentation including a sequence of media segments, the sequence of media segments having a plurality of different durations, the sequence of media segments including a repeating pattern of the different durations;
   generate media timeline data, the media timeline data representing each of the media segments relative to a media timeline of the media presentation, the media timeline data employing a pattern syntax to represent instances of the repeating pattern; and
   publish the media timeline data as part of a manifest configured to enable a client device to download or stream the media presentation.

15. The system of claim 14, wherein the manifest is conformant with one of the dynamic adaptive streaming over HTTP (DASH protocol), the HTTP Live Streaming (HLS) protocol, the HTTP Dynamic Streaming protocol, or the Smooth Streaming protocol.

16. The system of claim 14, wherein the pattern syntax in the manifest includes a reference to a pattern definition stored in metadata associated with the media presentation.

17. The system of claim 14, wherein the one or more computing devices are further configured to detect the repeating pattern during generation of the media timeline data by inspecting the sequence of media segments.

18. The system of claim 14, wherein the one or more computing devices are further configured to receive the repeating pattern prior to generation of the media timeline data.

19. The system of claim 14, wherein the one or more computing devices are further configured to define the repeating pattern during a fragmentation stage or a content encoding stage of an encoding and packaging pipeline.

20. The system of claim 14, wherein the pattern syntax employs a pattern attribute, a plurality of duration attributes, and one or more repetition attributes, and wherein a segment element specifies values for each of the pattern attribute, the duration attributes, and the one or more repetition attributes to represent the instances of the repeating pattern.

21. The system of claim 14, wherein the pattern syntax employs a pattern element, and wherein at least one of a plurality of segment elements includes a repetition attribute, each segment element including a duration attribute, each segment element also including a group attribute that represents a corresponding group to which the segment element belongs, a first group of the segment elements corresponding to one or more instances of the repeating pattern, the pattern element including the group attribute representing the first group, the pattern element also including the repetition attribute representing a number of the instances of the repeating pattern.

22. The system of claim 14, wherein the pattern syntax employs a pattern element, and wherein at least one of a plurality of segment elements includes a repetition attribute, each segment element including a duration attribute, a subset of the segment elements being child elements of the pattern element, the subset of the segment elements corresponding to one or more instances of the repeating pattern, the pattern element including the repetition attribute representing a number of the instances of the repeating pattern.

* * * * *